Oct. 11, 1927.

J. B. FENDER 1,645,378

MINERAL MACHINE

Filed Dec. 13, 1926 3 Sheets-Sheet 2

J. B. Fender
Inventor,

By C. A. Snow & Co.
Attorneys.

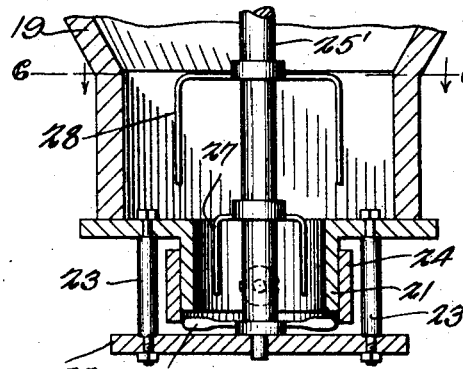
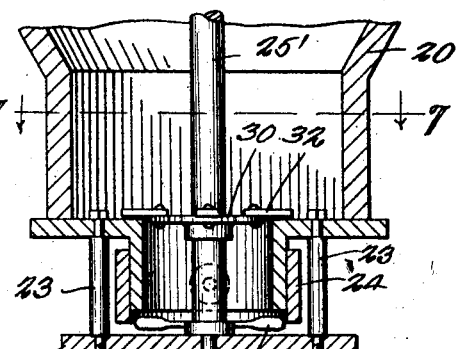
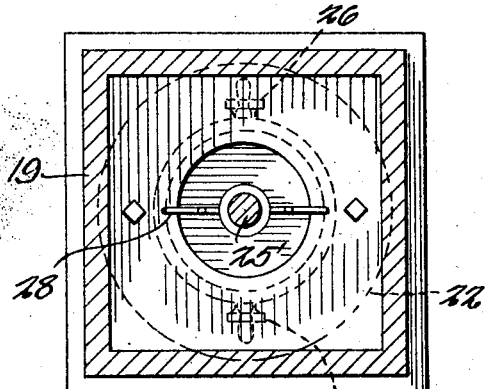
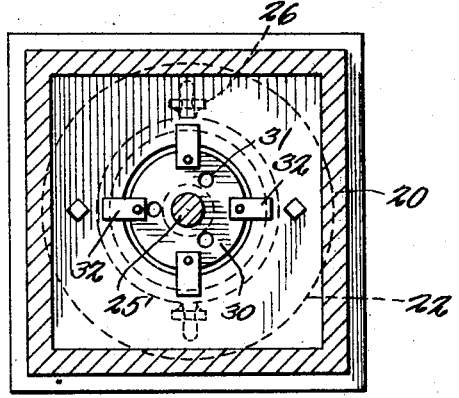
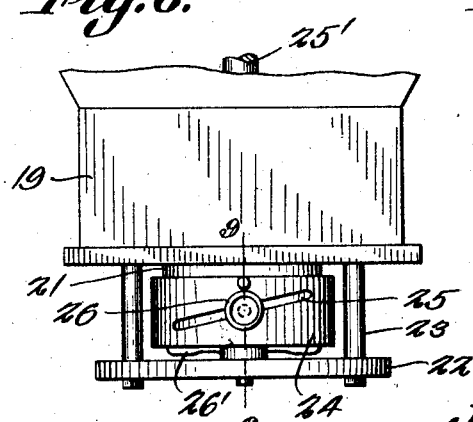

Patented Oct. 11, 1927.

1,645,378

UNITED STATES PATENT OFFICE.

JOHN BROWN FENDER, OF KAUFMAN, TEXAS.

MINERAL MACHINE.

Application filed December 13, 1926. Serial No. 154,519.

This invention relates to an apparatus designed for the purification of water, the primary object of the invention being to provide means whereby the minerals will be properly distributed and mixed with the water under treatment, to insure the purification of the water.

Another object of the invention is to provide agitators for agitating the minerals prior to the delivery of the materials to the mixing tank, and mixers in the mixing tank, means being provided for causing the operation of the agitators and mixers by the action of the water under treatment, as it passes into the mixing tank.

A still further object of the invention is the provision of means for regulating the amount of minerals used by the flow of water to the main mixing tank so that the proportion of the chemicals to the water will remain the same regardless of the rate of flow of the water.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 4 is a vertical sectional view through the lower portion of the hopper employed for delivering lime.

Figure 5 is a vertical sectional view through the lower portion of the hopper employed for delivering alum.

Figure 6 is a sectional view taken on line 6—6 of Figure 4.

Figure 7 is a sectional view taken on line 7—7 of Figure 5.

Figure 8 is an elevational view illustrating the lower portion of one of the hoppers.

Figure 9 is a sectional view taken on line 9—9 of Figure 8.

Figure 1:
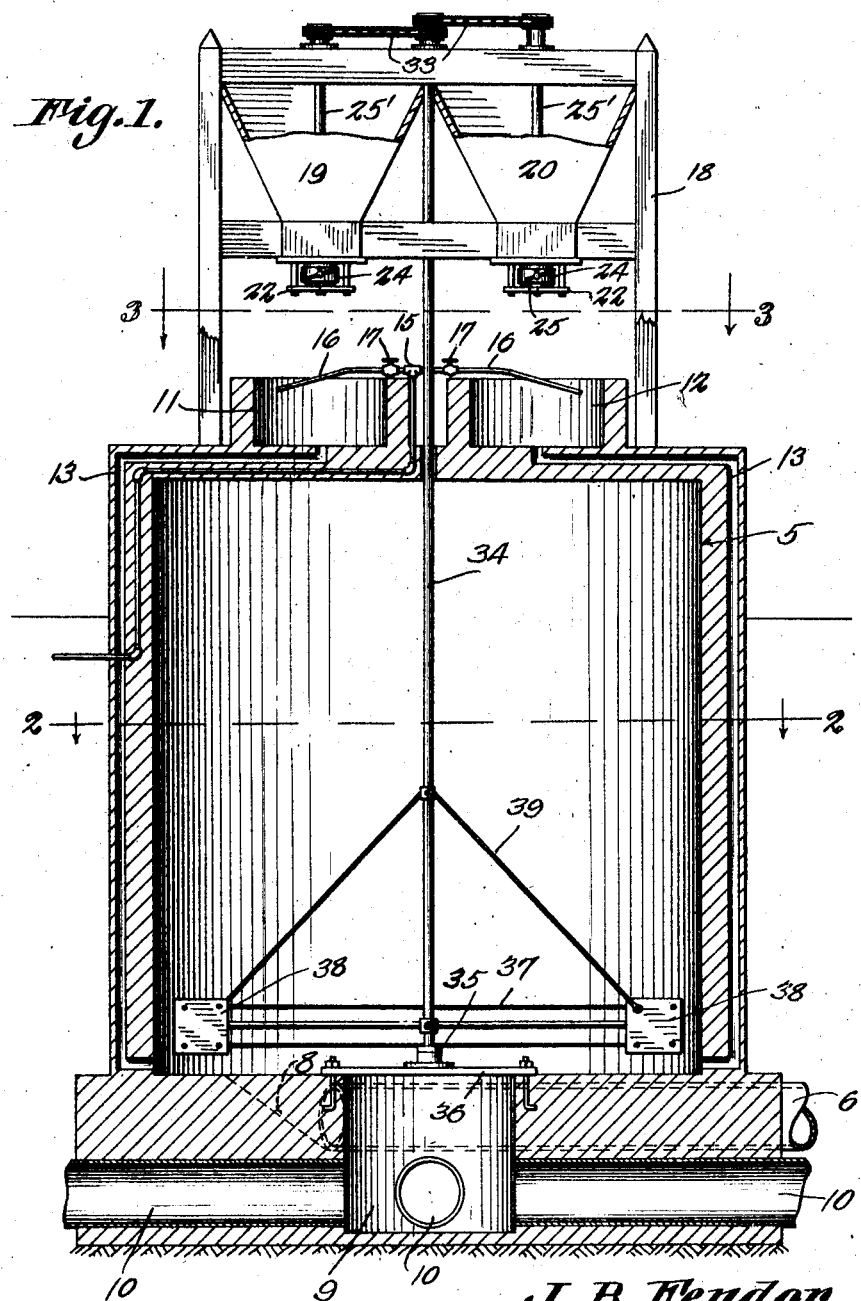
Figure 1 is a vertical sectional view through an apparatus constructed in accordance with the invention.
Figure 2:
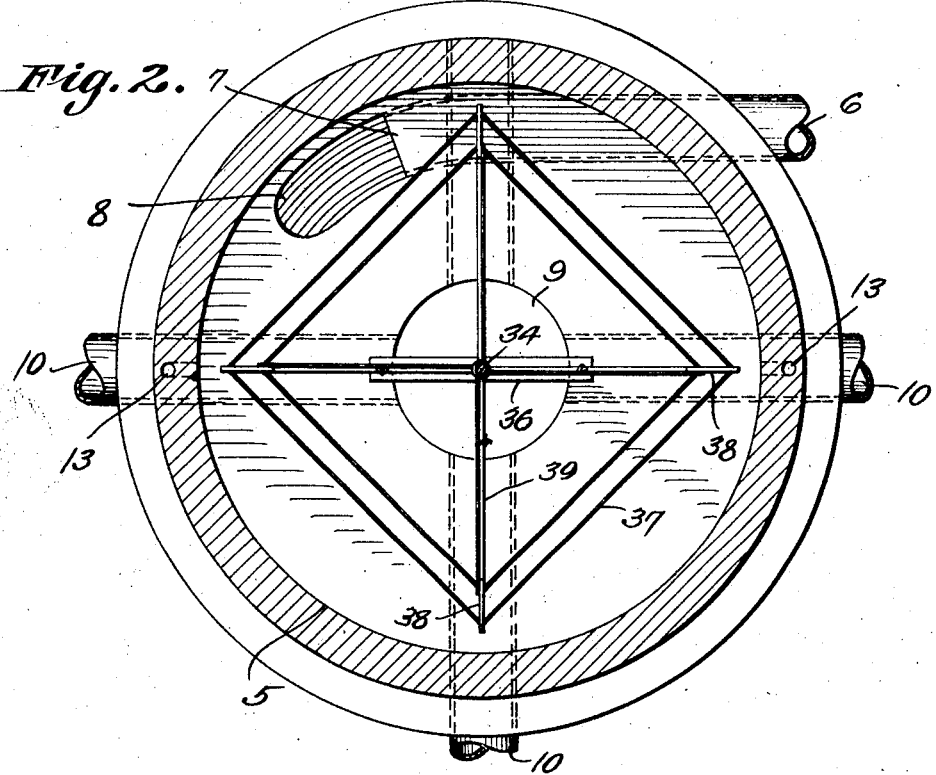
Figure 2 is a transverse sectional view taken on line 2—2 of Figure 1.
Figure 3:
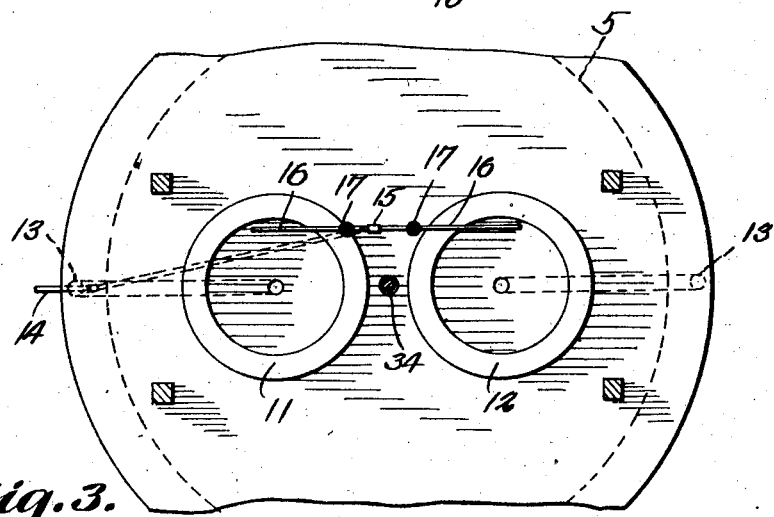
Figure 3 is a sectional view taken on line 3—3 of Figure 1.

Referring to the drawings in detail, the reference character 5 designates the main or mixing tank which may be constructed of any suitable material, the same being partially buried in the ground surface.

The reference character 6 indicates the inlet pipe that is in communication with a suitable source of water supply and as shown, the discharge end of the pipe 6 is slightly curved as at 7 and disposed adjacent to the wall of the tank, the pipe being arranged to discharge water onto the upwardly inclined surface 8, so that the water will be directed upwardly and take a swirling motion as it passes into the main or mixing tank 5.

Disposed centrally of the tank 5, and arranged in the bottom thereof, is a receiving basin 9 into which the pipes 10 extend, which pipes 10 carry off material from the tank 5 after it has been thoroughly treated.

The upper portion of the basin 9 is open so that the water in the tank may pass unobstructed into the basin 9 to be carried off through the pipes 10.

Tanks 11 and 12 are on the upper surface of the tank 5 and have openings in their bottoms which communicate with the passageways 13 formed in the side wall of the tank 5, the passageways 13 being shown as extending into the tank 5 at the base thereof.

A pipe indicated at 14 extends inwardly and is embedded in the wall of the tank 5, one end of the pipe being provided with a T-coupling 15 to which the laterally extended pipes 16 are connected, which pipes 16 deliver water to the tanks 11 and 12, there being provided valves 17 for controlling the passage of water to the tanks 11 and 12.

Mounted on the tank is a frame 18 that supports hoppers 19 and 20, the hopper 19 being designed to contain lime, while the hopper 20 is designed to contain alum.

The tanks are provided with spouts 21 through which the material passes on passing from the hoppers, and as shown, a plate 22 forms a part of each hopper, the plates being supported in spaced relation with the discharge end of the spouts 21 as by means of the supporting members 23.

Cooperating with each spout 21 is an adjustable sleeve 24, which sleeves are provided with elongated openings 25 disposed at oblique angles, the openings 25 being designed to accommodate bolts 26 that extend into threaded openings of the spouts and which are adapted to clamp the sleeves to hold them in various positions of vertical adjustment to regulate the space between the bottom of the sleeves and plates 22 to regulate the quantity of material discharged therefrom.

Extending upwardly through each hopper is a shaft 25', which shafts have their lower end portions positioned in openings in the plates 22, and as shown, each shaft is provided with agitating blades 26' operating directly over the plate 22 associated therewith.

The shaft operating in the hopper 19 is provided with depending fingers 27 and 28, the fingers 27 being shorter than the fingers 28 to operate within the spout 21, while the fingers 28 operate in the lower ends of the hopper.

The shaft 25 operating in the hopper 20 is also provided with agitating arms 26', and a disk 30 disposed at a point adjacent to the mouth of the spout 21, the disk 30 being provided with discharge openings 31 and fingers 32, the fingers 32 being designed to agitate the material so that quantities thereof will be passed into the spout.

These shafts 25 are provided with sprockets on their outer ends, which sprockets accommodate the chains 33, which operate over sprockets disposed at the upper end of the main operating shaft 34, the lower end of the shaft 34 extending to a point adjacent to the bottom of the tank 5 where it rests in the bearing 35 positioned on the bar 36 that spans the upper end of the basin 9.

A plurality of arms 37 extend from the shaft 34 and have blades 38 mounted at their outer ends, which blades are also held in their active positions by means of the brace rods 39, and as shown, these blades 38 are supported in such relation with the discharge end of the pipe 6 that water passing into the tank 5 will be directed to the blades 38 to rotate the shaft 34, the blades at the same time acting to agitate or mix the water and minerals deposited therein.

From the foregoing it will be seen that as water passes into the tank, the shaft 34 is rotated which operates the agitating means in the hoppers, causing minerals to be deposited in the tanks 11 and 12, where the minerals mix with water passing through the pipes 16 which solution passes through the passageways 13 and into the main mixing tank 5, where it mixes with the water passing into the tank to the supply pipe 6.

Should the pressure of incoming water be increased, speed of rotation of the agitating members within the hoppers will also be increased, to the end that proportionately the proper amount of mineral will be deposited in the mixing tank.

Should the pressure of the inflowing water be decreased, it is obvious that the speed of rotation of shaft 34 will be decreased so that the proper quantity of mineral will be deposited in the mixing tank 5.

I claim:

1. An apparatus of the class described embodying a main mixing tank, agitating members in the main mixing tank, hoppers above the tank, agitators operating within the hoppers, auxiliary tanks above the first mentioned tank and in communication therewith, means controlled by the movement of the first mentioned agitating members for operating the agitating members in the hoppers to deliver material into the auxiliary tanks, means for directing water into the main mixing tank to operate the agitators, and means for directing material from the main mixing tank.

2. An apparatus of the class described including a main mixing tank, agitators in the main mixing tank and having blades, means for directing water to the main mixing tank at a point adjacent to the wall of the main mixing tank, said blades lying in the path of travel of the water entering the main mixing tank, a vertical shaft on which the agitators are mounted, means above the tank for delivering minerals to the main mixing tank, and including agitators, means for directing rotary movement of the shaft to the last mentioned agitators, and means for carrying off liquid from the main mixing tank.

3. An apparatus of the class described including a main mixing tank, hoppers above the main mixing tank, agitating members in the hoppers, an agitating member in the main mixing tank, means for transmitting movement of the agitators in the main mixing tank to the agitators in the hoppers above the main mixing tank, the agitator in the main mixing tank including blades, a pipe for directing water to the main mixing tank, and to the blades for rotating the agitating members, and pipes for carrying off liquid from the main mixing tank.

4. An apparatus of the class described including a main mixing tank, an agitator in the main mixing tank and adapted to be rotated by the passage of water to the main mixing tank, hoppers above the main mixing tank for delivering material to the main mixing tank, and means for regulating the quantity of material discharged from the hoppers.

5. An apparatus of the class described including a main mixing tank, an agitator in the main mixing tank, hoppers above the main mixing tank for delivering minerals to the main mixing tank, each of said hoppers including a discharge spout, agitators in the hoppers, said agitators embodying blades operating under the spouts, and adjustable members on the spouts for regulating the passage of material from the spouts.

In testimony that I claim the foregoing as my own, I have hereto affixed my signature.

JOHN BROWN FENDER.